United States Patent [19]
Taga et al.

[11] Patent Number: 5,326,583
[45] Date of Patent: * Jul. 5, 1994

[54] METHOD FOR PREPARING SNACK FROM CHLOROPHYLL-CONTAINING PLANT TISSUE

[75] Inventors: Kazumitsu Taga, Neyagawa; Toshihiko Narukami, Ikoma; Yoshiyuki Miyaoku, Sakai, all of Japan

[73] Assignee: House Food Industrial Co., Ltd., Higashi-Osaka, Japan

[*] Notice: The portion of the term of this patent subsequent to Feb. 2, 2010 has been disclaimed.

[21] Appl. No.: 775,452

[22] Filed: Oct. 15, 1991

[30] Foreign Application Priority Data

Oct. 19, 1990 [JP] Japan .................. 2-281337

[51] Int. Cl.$^5$ .......... A23L 1/18; A23P 1/12; A23P 1/14
[52] U.S. Cl. ............... 426/615; 426/270; 426/448; 426/449; 426/450; 426/621; 426/625; 426/629; 426/808
[58] Field of Search ........... 426/448, 449, 450, 270, 426/621, 625, 629, 808, 615

[56] References Cited

U.S. PATENT DOCUMENTS

| | | | |
|---|---|---|---|
| 4,517,204 | 5/1985 | Mottur et al. | 426/448 |
| 4,748,037 | 5/1988 | Matsumoto et al. | 426/448 |
| 4,869,911 | 9/1989 | Keller | 426/448 |
| 5,183,678 | 2/1993 | Taga et al. | 426/448 |

FOREIGN PATENT DOCUMENTS 61-9253 1/1986 Japan .

OTHER PUBLICATIONS

Cruess, W. V. 1938, Commerical Fruit and Vegetable Products, 2nd Ed., McGraw-Hill Book Co., Inc., N.Y. p. 741.
O. R. Fennema, Condensed from "Principles of Food Science Part 1 Food Chemistry", 1976, pp. 1–4.

*Primary Examiner*—Helen Pratt
*Attorney, Agent, or Firm*—Oblon, Spivak, McClelland, Maier & Neustadt

[57] ABSTRACT

A puffed snack is prepared from chlorophyll-containing plant grains by pulverizing the grains under completely light shielding conditions, storing the resulting pulverized grains under complete light shielding conditions or light shielding conditions applied within 24 hours after pulverization and puffing the grains in a screw extruder having a die wherein the temperature of the die ranges from 90° to 150° C. for the resulting pulverized grains having a water content of 9–11%, the temperature of the die ranging from 100° to 210° for the resulting pulverized grains having a water content of from 11 to 15%, and the temperature of the die ranging from 160° to 240° C. for the resulting pulverized grains having a water content from 15 to 20%, so that the degree of puffing falls within a range of from 3.0 to 28.0 times the volume of the chlorophyll-containing plant to give a puffed product having a water content of not more than 7% by weight or drying the puffed product until the water content is not more than 7% by weight, applying fat and oil to the resulting puffed product and packing the resulting snack into a container having light shielding properties, the total time for light exposure during the steps of puffing, applying fat and oil and packing being less than 18 hours.

8 Claims, No Drawings

METHOD FOR PREPARING SNACK FROM CHLOROPHYLL-CONTAINING PLANT TISSUE

BACKGROUND OF THE INVENTION

The present invention relates to a method for preparing a snack in which chlorophyll-containing plants are employed as ingredients and more specifically to a method for preparing a snack which makes it possible to effectively prevent discoloration of the snack and deterioration of the taste thereof during storage.

There have conventionally been proposed a variety of methods for preparing snack confectioneries in which chlorophyll-containing plants are employed as ingredients. For instance, Japanese Unexamined Patent Publication (hereinafter referred to as "J. P. KOKAI") No. Sho 61-58539 (corresponding to U.S. Pat. No. 4,748,037) discloses a method which comprises supplying beans, which may be entire grains or whose husk has been removed, to a twin-screw extruder, adjusting the water content thereof with or without addition of water, then subjecting the ingredient to extrusion-cooking, spraying an aqueous salt solution on the extruded product and then drying by passing air therethrough and J. P. KOKAI No. Sho 61-9253 discloses a method which comprises primarily puffing a starch-containing substance in an extruder, pulverizing the primarily puffed substance, mixing heat-sensitive components with the pulverized substance and then extruding the mixture through a die at a low temperature to thus carry out puffing.

However, such snack confectioneries prepared from plants which contain chlorophyll suffer from problems of, for instance, discoloration of the confectioneries and deterioration of the taste thereof (more specifically, the taste peculiar to the plants is reduced while a different taste is given out) during the storage. These problems are conspicuous, in particularly when the chlorophyll-containing plant is the pea or when the snack confectioneries of this kind are prepared through a puffing treatment.

SUMMARY OF THE INVENTION

Accordingly, a primary object of the present invention is to provide a method for preparing a snack from chlorophyll-containing plants which makes it possible to effectively prevent discoloration of the snack and deterioration of the taste thereof during the storage.

This and other objects of the present invention will be apparent from the following description and Examples.

The inventors of this invention have conducted various studies to achieve the foregoing object, have found out that the foregoing problems can effectively be solved if (a) the processes subsequent to the process in which the tissues of the chlorophyll-containing plant are broken are carried out under substantially light-shielding conditions and (b) the resulting snack are packaged in a container having light-shielding properties and thus have completed the present invention.

According to the present invention, the foregoing object can effectively be attained by providing a method for preparing a snack from a chlorophyll-containing plant which comprises the steps of carrying out processes subsequent to the process in which the tissues of the chlorophyll-containing plant are broken under substantially light-shielding conditions and then packaging the resulting snack in a container having light-shielding properties.

DESCRIPTION OF THE PREFERRED EMBODIMENT

The method for preparing a snack from chlorophyll-containing plants according to the present invention will hereafter be explained in more detail.

Examples of the chlorophyll-containing plants usable in the invention as ingredients for preparing a snack include beans such as pea (*Pisum sativum*), broad bean (*Vicia faba*) and mung bean (*Vigna radiata*); and vegetables such as spinach, sweet pepper and stone parsley. The method for preparing a snack from the pea as an ingredient will be taken by way of example in the following description to explain the present invention in detail, but the invention is by no means limited to the specific example.

In the method of this invention, it is very important to carry out the processes subsequent to one in which the tissues of the pea (a chlorophyll-containing plant) are broken under substantially light-shielding conditions. The term "processes subsequent to one in which the tissues are broken" means, when a pea is pulverized in advance, those subsequent to the pulverization process, while if a pea is not pulverized (i.e., when the pea in the form of entire grains is directly puffed in an extruder), the term means the processes subsequent to the puffing process in the extruder. Moreover, the term "substantially light-shielding conditions" herein means not only the conditions in which the ingredient is completely shielded from light rays such as natural light rays and light rays from fluorescent tubes, but also the reduction of time during which the ingredient is exposed to light rays.

First, other ingredients required for preparing a snack are appropriately added to and mixed with pea grains.

The pea grains used may or may not have the husk (epidermis portions). However, pea grains having a husk (i.e., entire pea grains) are preferred because the resulting puff snack comprises abundant dietary fibers and the taste peculiar to the pea is further enhanced. On the other hand, the use of pea grains free of the husk ensures the production of puff snacks having clear color tone. The pea may be used in the form of the entire grain or may be pulverized in advance as described above. In the latter, it is desirable to store the pulverized pea grains under substantially light-shielding conditions, for instance, to store them in a paper bag or to subject the pulverized pea grains to puffing in an extruder within 24 hours, preferably 8 hours and more preferably 3 hours after the pulverization.

The pea grains preferably have a grain size such that they can pass through a sieve having openings of 8000 μm and thus the scorching of the resulting puff snack during the extrusion-cooking can effectively be prevented. More specifically, the entire grains of pea preferably have a grain size such that they can pass through a sieve having openings of 8000 μm and at least 45%, preferably at least 60% of the pulverized pea grains preferably have a grain size such that they can pass through a sieve having openings of 4000 μm and cannot pass through a sieve having openings of 1000 μm.

This is because if the relative amount of the ingredient having a grain size greater than the upper limit defined above, the resulting puff snack is liable to cause scorching, while if the rate of the ingredient having a grain size smaller than the lower limit defined above, the degree of puffing of the resulting puff snack is insufficient. This tendency becomes more conspicuous in particular when a short screw type single-screw extruder is employed as an extruder for puffing.

Examples of ingredients for preparing a snack other than pea include powder or grains such as rice flour, corn grits, wheat flour, wheat starch, corn starch, potato starch and defatted soybean which may be used alone or in any combination. In this respect, the simultaneous use of deffatted soybean and pea makes it possible to impart a taste of roasted ingredient to the resulting puff snack. Moreover, the ingredient may further comprise other additives such as seasonings, e.g., common salt and sugars and flavors. The ingredient may comprise a coloring agent without any difficulty, but the method of the present invention can provide puff snacks having the satisfactory color tone peculiar to the pea without using any coloring agent.

The amount of the ingredients other than pea is suitably adjusted so that the weight of the pea is not less than 55% by weight, preferably 80 to 100% by weight on the basis of the total weight of the whole ingredients for snack food. This is because if the amount of pea is lower than 55% by weight, the resulting puff snack is often insufficient in the taste and color tone peculiar to the pea.

The water content of the ingredient is in general controlled to 9 to 20%, preferably 9 to 15% and more preferably 12 to 13%. In this respect, if a short screw type single-screw extruder is used, the water content ranges from 9 to 16%, preferably 9 to 15% and more preferably 12 to 13%. If the water content is less than the lower limit, clogging of the extruder with the ingredient and the scorching of the ingredient are possibly caused during the puffing operation. On the other hand, if it exceeds the upper limit, the resulting puff snack has an insufficient taste peculiar to the pea and a rather soft taste and is insufficiently puffed depending on the treating conditions. If the ingredient has a water content outside of the range defined above, it may be adjusted by, for instance, adding water to or drying the ingredient in advance so as to fall within the range defined above. In this case, if previously pulverized peas are used as an ingredient, it is preferred to use the pulverized grains having a water content falling within the above-stated range, whereby discoloration of the resulting puff snack and deterioration of the taste thereof during the storage can effectively be prevented.

Then the ingredient having a water content falling within the foregoing range is introduced into an extruder to puff the same at a die temperature ranging from 90° to 240° C., preferably 90° to 190° C. so that the degree of puffing is equal to 3 to 28, preferably 5.1 to 16.0. In this connection, the degree of puffing is determined by cutting the puffed product immediately after the extrusion into pieces having a shape geometrically similar to that of the starting material (approximately spheres) and then calculating the volumes thereof to obtain the volume ratio of the puffed product to the starting material.

In the present invention, the processes subsequent to the puffing process, i.e., the cutting process, the drying process, the process for applying fats and oils, the process for sprinkling common salt or the like and the packaging process as well as the transporting and storing stages between the foregoing subsequent two processes (hereinafter referred to as "retention step(s)") are performed under a cover having light-shielding properties, i.e., under the light-shielding conditions or the time during which the puffed product is exposed to light in each process is reduced as short as possible. Further, a part of the processes are carried out under the light-shielding conditions and the light-exposure time in the remaining processes is reduced as short as possible.

When the time during which the puffed product is exposed to light is to be reduced, the specific range thereof varies depending on various factors such as the intensity of light, the temperature of atmosphere and the water content of the puffed product. For instance, if the water content of the product exceeds 8%, it is desirable to limit the light-exposure time in each process to not more than 15 hours, preferably not more than 5 hours and more preferably less than 2 hours. In this respect, it is further desirable that the total time period for the light-exposure during the whole steps of puffing to packaging be not more than 15 hours, preferably not more than 5 hours, more preferably not more than 2 hours. If the water content is not more than 8%, it is desirable to limit the light-exposure time in each process to not more than 18 hours, preferably not more than 6 hours and more preferably less than 2 hours. In this respect, it is further desirable that the total time period for the light-exposure during the whole steps of puffing to packaging be not more than 18 hours, preferably not more than 6 hours, more preferably not more than 2 hours.

The die temperature, more specifically, ranges from 90° to 150° C. in case where the ingredients having a water content ranging from 9 to 11% are used; 100° to 210° C., preferably 140° to 210° C. and more preferably 150° to 190° C. in case where the ingredients having a water content ranging from 11 to 15% are used; and 160° to 240° C. and preferably 180° to 240° C. in case where the ingredients having a water content ranging from 15 to 20% are used. This is because if it is less than the lower limit, the resulting puff snack is insufficiently puffed, while if it exceeds the upper limit, the resulting puff snack is often scorched and has a burnt taste.

The degree of puffing is preferably 3 to 23 if pea is used alone as an ingredient. Further, it preferably ranges from 5.1 to 12.7 and more preferably 5.5 to 7.1 to impart, to the resulting puff snack, the color tone close to that peculiar to the pea. Moreover, if other ingredients for preparing the snack are used simultaneously with pea, it preferably ranges from 3 to 26. Further, it preferably ranges from 5.6 to 14 and more preferably 6.1 to 11.9 to impart, to the resulting puff snack, the color tone close to that peculiar to the pea.

If the degree of puffing is less than the lower limit, the resulting puff snack is insufficiently puffed and is too hard to be commercially acceptable, while if it exceeds the upper limit, the resulting puff snack does not often have a satisfactory toughness and a heavy taste, but has an extremely light taste.

Extruders usable in the method of the present invention are not restricted to specific ones and, for instance, a short screw type single-screw extruder having an L/D ratio of not more than 5 can be used. Other long screw type single-screw extruders may likewise be used, but it is preferred to use a short screw type single-screw extruder because it can effectively prevent the occurrence of scorching and can provide puff snacks having a taste with toughness. Moreover, the short srew type single-screw extruder exhibits other additional advantages in that it is not expensive and that it permits bulk handling.

The pressure for the puffing process, for instance, ranges from 30 to 160 kg/cm².

The number of revolutions of the screw and the feed rate of the ingredient required for satisfying the foregoing pressure condition vary depending on various factors such as the kinds of extruders used, the size of each part of the extruder and the area and the number of pores formed in the die. For instance, if Collet Machine available from Tape Inc. (a short screw type single-screw extruder provided with a die in which two pores having a diameter of 2 to 4 mm are formed) is adopted as an extruder, the foregoing pressure condition can be established by selecting the number of revolutions of the screw ranging from 400 to 1000 rpm, preferably 400 to 600 rpm; and a feed rate ranging from 400 to 1800 g/min, preferably 400 to 700 g/min.

The resulting puffed product is then cut into pieces having an appropriate length and optionally dried by, for instance, hot-air drying to thus control the water content of the puffed product to not more than 7%, preferably not more than 2%. If the water content of the resulting puffed product exceeds 7%, discoloration of the resulting puff snack and deterioration of the taste thereof during the storage cannot sufficiently be prevented. Moreover, the drying treatment for controlling the water content of the resulting puff snack to not more than 7% should be performed within 15 hours, preferably 6 hours after the completion of the puffing process in order to ensure the effect of the present invention. The temperature and the relative humidity (RH) of the atmosphere in the whole retention steps from the puffing process till the drying process are desirably not more than 30° C. and not more than 60%.

The puffed product thus obtained may be subjected to a process for applying fats and oils by, for instance, spraying or coating. Thus, the resulting puff snack which had been puffed to a degree of puffing ranging from 3 to 28 and then coated with the fat and oil has a heavy taste with sufficient toughness, can easily be mixed with saliva and leaves a pleasant aftertaste.

The amount of the fat and oil to be applied desirably ranges from 30 to 150 parts by weight, preferably 40 to 80 parts by weight per 100 parts by weight of the puffed product. The fat and oil preferably have a melting point ranging from 0° to 40° C. In addition, the temperature of the fat and oil upon applying to the puffed product, for instance, ranges from 10° to 220° C., but preferably ranges from 150° to 220° C. from the viewpoint of imparting an aroma of fried ingredient to the resulting puff snack.

Then the puffed product thus obtained may optionally be sprinkled with common salt, seasonings or the like.

According to the present invention, the resulting puffed product (puff snack) is then packed in a container having light-shielding properties. This process is very important in the invention. Examples of the packaging material having light-shielding properties include bags of aluminum or those having deposited aluminum layers. Paper boxes and wooden boxes can likewise be used without any problem.

As has been detailed above, according to the present invention, discoloration of the puff snack and deterioration of the taste thereof can effectively be prevented by carrying out processes subsequent to one in which the tissues of the chlorophyll-containing plant are broken under substantially light-shielding conditions and then packaging the resulting puffed product (snack) in a container having light-shielding properties.

The present invention will hereunder be explained in more detail with reference to the following non-limitative working Examples and the effects practically achieved by the present invention will also be discussed in detail in comparison with Comparative Examples.

EXAMPLE 1

After pulverizing pea with the husk and storing the resulting pulverized product for one week in a paper bag, the pulverized product (water content: 10%; 69% of the total grains being capable of passing through a sieve having openings of 4000 μm and incapable of passing through a sieve having openings of 2000 μm) was puffed in a single-screw extruder, Collet Machine (fitted with a die provided with two circular pores having a diameter of 3 mm) available from Tape Inc., at a die temperature of 90° C., a feed rate of 600 g/min and a number of revolution of the screw of 500 rpm and the resulting puffed product (water content: 4%; degree of puffing: 7) was cut into pieces having a length of 4 cm.

Then the product was hot-air dried at 180° C. for 2 minutes, palm oil was sprayed on the product (water content: 1.7%) in an amount of 60 parts by weight per 100 parts by weight of the product and 1% of common salt was sprinkled onto the puffed product which had been coated with the palm oil. Then the resulting puff snack was packed in a bag on which aluminum had been deposited and sealed airtight. The foregoing processes from the hot-air drying to the sprinkling of common salt were performed below a cover having light-shielding properties. On the other hand, the puffed product was exposed to light (from fluorescent tubes) during the retention step (from immediately after the puffing process till just before the hot-air drying process) and the packaging process and each exposure time was one hour.

The puff snack was stored in the packaged state for 3 months at ordinary temperature and thereafter it was tasted. The puff snack had a sufficient taste peculiar to the pea and colored green quite similar to that of the original pea.

Comparative Example 1

The same procedures used in Example 1 were repeated to give a puff pea. The snack was then packaged in a bag prepared from a polypropylene film coated with polyvinylidene chloride, sealed airtight and then stored at ordinary temperature.

The color of the puff snack was changed to a quite whitish color one month after the storage. Moreover, the puff snack did not have any taste peculiar to the pea and was hence commercially unacceptable.

EXAMPLE 2

After pulverizing pea with the husk and allowing the resulting pulverized product to stand for one hour while it was exposed to light, the pulverized product (water content: 10%; 69% of the total grains being capable of passing through a sieve having openings of 4000 μm and incapable of passing through a sieve having openings of 2000 μm) was puffed in a single-screw extruder, Collet Machine (fitted with a die provided with two circular pores having a diameter of 3 mm) available from Tape Inc., at a die temperature of 100° C., a feed rate of 530 g/min and a number of revolution of the screw of 500 rpm and the resulting puffed product (water content: 4%; degree of puffing: 10.4) was cut into pieces having a length of 4 cm below a cover having light-shielding properties.

Then the product was hot-air dried at 180° C. for 2 minutes, fats and oils were sprayed on the product (water content: 1.7%) in an amount of 60 parts by weight per 100 parts by weight of the product and 1% of common salt was sprinkled onto the puffed product which had been coated with the palm oil. Then the resulting puff snack was packed in a bag on which aluminum had been deposited and airtightly sealed. The foregoing processes from the hot-air drying till the sprinkling of common salt were performed below a cover having light-shielding properties. On the other hand, the puffed product was exposed to light during the retention step (from immediately after the cutting process till just before the hot-air drying process) and the packaging process and each exposure time was one hour.

The puff snack was stored in the packaged state for 3 months at ordinary temperature and thereafter it was tasted. The puff snack had a sufficient taste peculiar to the pea and colored green quite similar to that of the original pea.

Comparative Example 2

The same procedures used in Example 2 were repeated except that the resulting puffed product was exposed to light for 24 hours after cutting the product and before hot-air drying and the resulting puff snack was packaged in a bag on which aluminum layer had been deposited, airtightly sealed and then stored at ordinary temperature. Then the puff snack was tasted 3 months after the storage. The color of the puff snack was changed to a quite whitish color one month after the storage. Moreover, the puff snack did not have any taste peculiar to the pea and was commercially unacceptable.

EXAMPLE 3

Peas with husks, i.e., entire pea grains (water content: 10%; the grains capable of passing through a sieve haveing openings of 8000 μm) were puffed in a single-screw extruder, Collet Machine (fitted with a die provided with two circular pores having a diameter of 3 mm) available from Tape Inc., at a die temperature of 90° C., a feed rate of 600 g/min and a number of revolution of the screw of 500 rpm and the resulting puffed product (water content: 4%; degree of puffing: 7.1) was cut into pieces having a length of 4 cm below a cover having light-shielding properties.

Then the product was hot-air dried at 180° C. for 2 minutes, palm oil was sprayed on the product (water content: 1.7%) in an amount of 60 parts by weight per 100 parts by weight of the product and 1% of common salt was sprinkled onto the puffed product which had been coated with the palm oil. Then the resulting puff snack was packed in a bag on which aluminum had been deposited and airtightly sealed. The foregoing processes from the hot-air drying till the sprinkling of common salt were performed below a cover having light-shielding properties. On the other hand, the puffed product was exposed to light during the retention step (from immediately after the cutting process till just before the hot-air drying process) and the packaging process and each exposure time was one hour.

The puff snack was stored in the packaged state for 3 months at ordinary temperature and thereafter it was tasted. The puff snack had a sufficient taste peculiar to the pea and colored green quite similar to that of the original pea.

EXAMPLE 4

An ingredient (water content: 12.8%) obtained by blending pea grains immediately after pulverizing peas with the husks (water content: 13%; 69% of the total grains being capable of passing through a sieve having openings of 4000 μm and incapable of passing through a sieve having openings of 2000 μm) and rice powder having a water content of 12% in a ratio of 80:20 was puffed in a single-screw extruder, Collet Machine (fitted with a die provided with two circular pores having a diameter of 3 mm) available from Tape Inc., at a die temperature of 200° C., a feed rate of 600 g/min and a number of revolution of the screw of 500 rpm and the resulting puffed product (water content: 4%; degree of puffing: 6.5) was cut into pieces having a length of 4 cm.

Then the product was hot-air dried at 180° C. for 2 minutes, vegetable oil was sprayed on the product (water content: 1.7%) in an amount of 60 parts by weight per 100 parts by weight of the product and 1% of common salt was sprinkled onto the puffed product which had been coated with the fats and oils. Then the resulting puff snack was packed in a bag on which aluminum had been deposited and airtightly sealed. The foregoing processes from the hot-air drying till the sprinkling of common salt were performed below a cover having light-shielding properties. On the other hand, the puffed product was exposed to light during the retention step (from immediately after the cutting process till just before the hot-air drying process) and the packaging process and each exposure time was one hour.

The puff snack was then stored in the packaged state for 3 months at ordinary temperature and thereafter it was tasted. The puff snack had a sufficient taste peculiar to the pea and colored green quite similar to that of the original pea.

What is claimed is:

1. A method for preparing a puffed snack from a chlorophyll-containing plant, comprising the steps of:
   pulverizing chlorophyll-containing plant tissue under completely light shielding conditions;
   storing the resulting pulverized material under complete light shielding conditions or light shielding conditions applied within 24 hours after pulverization;
   puffing the pulverized material in a screw extruder having a die wherein the temperature of the die ranges from 90° to 150° C. for the resulting pulverized material having a water content of 9–11%; the temperature of the die ranges from 100° to 210° C. for the resulting pulverized material having a water content of from 11 to 15%; and the temperature of the die ranges from 160° to 240° C. for the resulting pulverized material having a water content of from 15% to 20%, so that the degree of puffing falls within the range of from 3.0 to 28.0 times the volume of the chlorophyll-containing plant to give a puffed product having a water content of not more than 7% by weight or drying the puffed product until the water content is not more than 7% by weight;
   applying fat and oil to the resulting puffed product; and packing the resulting snack into a container having light shielding properties, wherein the total time for light exposure during the steps of puffing, applying fat and oil and packing is less than 18 hours.

2. The method of claim 1 wherein the chlorophyll-containing plant tissue is pulverized pea grains at least 45% of which are capable of passing through a sieve having openings of 4000 μm and incapable of passing through a sieve having openings of 1000 μm.

3. The method of claim 1 which further comprises ingredients other than peas in an amount such that the relative amount of the peas is not less than 55% on the basis of the total weight of all ingredients.

4. The method of claim 1 wherein the screw extruder is a short screw type single-screw extruder and the water content of the chlorophyll-containing plant ranges from 9 to 16%.

5. The method of claim 1 wherein fat and oil is applied to the puffed product by spraying or coating in an amount ranging from 30 to 150 parts by weight per 100 parts by weight of the puffed product.

6. The method of claim 1 wherein the puffed product is sprinkled with common salt and/or seasonings.

7. The method of claim 1 wherein the resulting puffed product is packed in bags of aluminum, bags having deposited aluminum layers, paper boxes or wooden boxes.

8. The method of claim 1, wherein the chlorophyll-containing plant tissue is pea grains as such or with the husks removed which pass through a sieve having openings of 8000 μm.

* * * * *